United States Patent
Schmidt

(12) 
(10) Patent No.: US 6,784,225 B2
(45) Date of Patent: Aug. 31, 2004

(54) SURFACE ENHANCER FOR MAKING A MOLDED METAL/CERAMIC ARTICLE

(75) Inventor: Kris Alan Schmidt, Granada Hills, CA (US)

(73) Assignee: 3D Systems, Inc., Valencia, CA (US)

( * ) Notice: Subject to any disclaimer, the term of this patent is extended or adjusted under 35 U.S.C. 154(b) by 37 days.

(21) Appl. No.: 10/010,708

(22) Filed: Nov. 9, 2001

(65) Prior Publication Data

US 2002/0086925 A1 Jul. 4, 2002

Related U.S. Application Data

(63) Continuation-in-part of application No. 09/709,193, filed on Nov. 10, 2000, now abandoned.

(51) Int. Cl.$^7$ .......................... C23C 22/00; C23C 22/80; C08L 25/14; C08L 35/02; C08L 35/06
(52) U.S. Cl. .......................... 523/139; 148/22; 523/300; 524/174; 524/413; 524/549; 524/559; 524/577
(58) Field of Search ........................ 148/22; 523/139, 523/300; 524/174, 413, 549, 559, 577, 398

(56) References Cited

U.S. PATENT DOCUMENTS

| | | | |
|---|---|---|---|
| 3,823,002 A | | 7/1974 | Kirby, Jr. et al. |
| 3,929,476 A | | 12/1975 | Kirby, Jr. et al. |
| 3,947,277 A | * | 3/1976 | Carnahan et al. ........ 106/31.64 |
| 4,327,156 A | | 4/1982 | Dillon et al. |
| 4,373,127 A | | 2/1983 | Haskett et al. |
| 4,431,449 A | | 2/1984 | Dillon et al. |
| 4,455,354 A | | 6/1984 | Dillon et al. |
| 4,469,654 A | | 9/1984 | Haskett et al. |
| 4,491,558 A | | 1/1985 | Gardner |
| 4,554,218 A | | 11/1985 | Gardner et al. |
| 4,863,538 A | | 9/1989 | Deckard |
| 4,929,507 A | * | 5/1990 | Nishihara et al. ........... 428/447 |
| 5,252,264 A | | 10/1993 | Forderhase et al. |
| 5,576,370 A | * | 11/1996 | Shimizu et al. ............. 524/413 |
| 5,648,407 A | * | 7/1997 | Goetz et al. ................ 523/213 |
| 5,914,162 A | * | 6/1999 | Bilkadi ....................... 428/35.8 |
| 5,989,476 A | | 11/1999 | Lockard et al. |

* cited by examiner

Primary Examiner—Kelechi C. Egwim
(74) Attorney, Agent, or Firm—Ralph D'Alessandro

(57) ABSTRACT

An improved enhancer formulation for use in forming precision molded articles from a furnace process is disclosed wherein an organometallic zirconia coupling agent is used in conjunction with a polymer in solvent to inhibit the bleed-through of infiltrant metal in a finished part formed in a single-step furnace process.

9 Claims, 3 Drawing Sheets

SURFACE ENHANCER FOR MAKING A MOLDED METAL/CERAMIC ARTICLE

This application is a continuation-in-part of U.S. Application Ser. No. 09/709,193 filed Nov. 10, 2000 now abandoned.

BACKGROUND OF THE INVENTION

1. Field of the Invention

The present invention relates generally to the forming of precision-molded articles such as hard molds for plastic injection molding or die casting from mixes of refractory or laser sinterable particles in heat fugitive organic binders. In particular, it relates to an improved formulation for an enhancer that improves the surface appearance and quality of the molded refractory or laser sintered article.

2. Description of the Prior Art

Prior processes for refractory molding included the two-step use of a furnace process that required a sintering step followed by a bronze metal infiltration step. U.S. Pat. No. 4,554,218 describes one such process. In the prior process, a binder is solely burned out of the parts after which the parts or articles are sintered at an elevated temperature and then the furnace in which the parts are sintered is cooled. The sintered parts are then removed and sprayed with a compound, including zirconia, to inhibit over-wetting past the steel surface of the part. The parts are then positioned in an appropriate device, heated to an elevated temperature for infiltration of the metal, and the furnace is cooled again. The cooling process in each instance is lengthy and time consuming. This is a disadvantage in the process adding costs, delay, and unnecessary handling.

The zirconia has been found to function as a barrier to the infiltration of the metal infiltrant. This is accomplished because of the different surface energies between the zirconia and the metal infiltrant so that the zirconia prevents the over-wetting or bleed-through of the metal infiltrant beyond the steel surfaces of the parts being formed.

An improved refractory furnace process has been developed that combines the sintering and infiltration steps so that the green parts are sprayed with an improved surface enhancer prior to being positioned in the appropriate apparatus for binder burnout, sintering and infiltration in a single step with accelerated cooling.

This process is described in U.S. Pat. No. 5,989,476. However, the improved process creates a problem of increased infiltrant bleeding through the coating and leaving the finished steel parts with an undesirable surface appearance, including discoloration with a gold-type appearance and cracking or wrinkling. The gold discoloration is attributed to the flaking off of the zirconia from the article during the binder burnout phase of the process. Additionally, there are problems encountered with the presence of carbon residue that is scavenged from the binder gases into the infiltrant. The sequestered carbon is subsequently released in the process after the infiltrant melts. It thereby forms a slag on the surface that inhibits the flow of the infiltrant into the metal part, resulting in infiltrant starvation in the finished part when the carbonaceous slag retains the infiltrant in the reservoir apparatus during the process.

Articles formed by the selective laser sintering process utilizing metal powder or metal/ceramic powder are also subject to bleed through problems. A suitable process and apparatus for performing selective laser sintering is described in U.S. Pat. Nos. 4,863,538 and 5,252,264.

These problems are solved in the use of the improved enhancer formulation of the present invention.

SUMMARY OF THE INVENTION

It is an aspect of the present invention that an improved polymer inhibitor is added to the surface enhancer solution that is applied to the green part in a furnace process to produce an infiltrated metal or metal/ceramic composite article which eliminates excess metal infiltrant-bleed-through in the finished part.

It is another aspect of the present invention that the improved polymer inhibitor is a polymer with an optimum formulation of between about two to four percent concentration by weight of the carrier solvent in the total enhancer formulation.

It is a feature of the present invention that the polymer inhibitor added to the enhancer is a poly(styrene-co-maleic acid), partial sec-butyl/methyl ester that is combined with the suspension of zirconia particles in a solvent.

It is another feature of the present invention that a zirconate coupling agent is used with the enhancer formulation to inhibit infiltrant-bleed-through and reduce surface cracking and wrinkling in the finished part.

It is still another feature of the present invention that the preferred coupling agent is a zirconate that is added to the zirconia inhibitor prior to the addition of the polymer.

It is an advantage of the present invention that the improved enhancer reduces metal infiltrant-bleed-through in the final finished part.

It is another advantage of the present invention that the improved enhancer reduces undesirable cracked and wrinkled surfaces in the finished part.

These and other aspects, features and advantages are obtained in the present invention by use of an improved enhancer with a solvent, a polymer, a

BRIEF DESCRIPTION OF THE DRAWINGS

These and other aspects, features and advantages of the invention will become apparent upon consideration of the following detailed disclosure, especially when taken in conjunction with the accompanying drawings wherein.

DETAILED DESCRIPTION OF THE PREFERRED EMBODIMENTS

Figure 1:
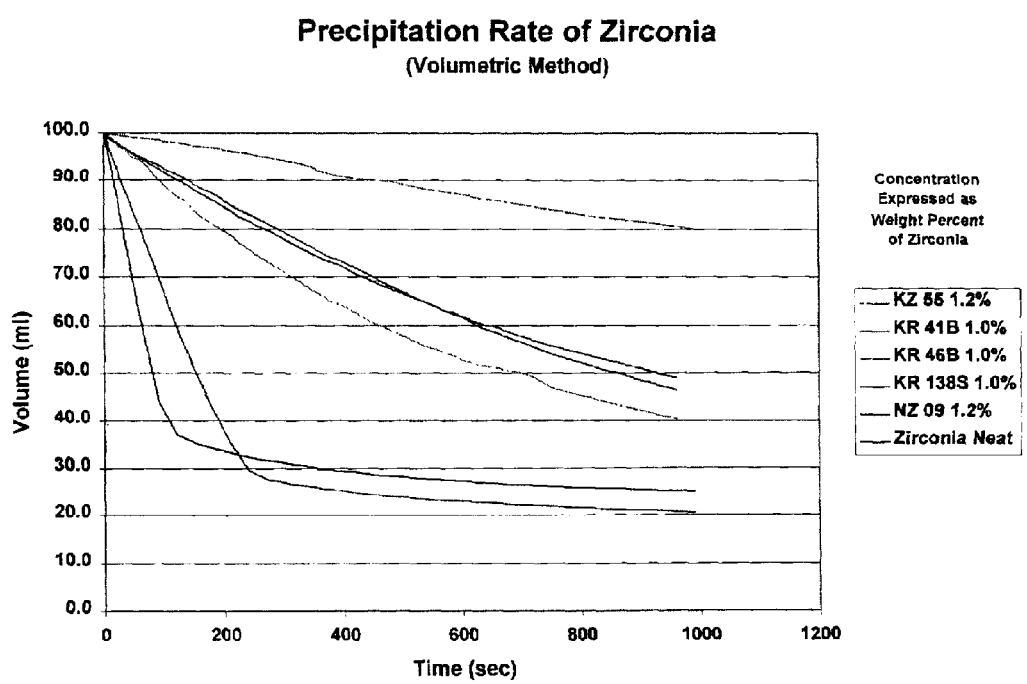
FIG. 1 is a graphical representation of the precipitation rate of zirconia when treated with different percentage organometallic coupling agents.

An approach was developed in order to alleviate the problem of infiltrant bleeding through the zirconia coating in a single step furnace infiltrated metal or metal/ceramic composite molding process. Carrier solvents and solvent leaching were evaluated, as were polymer additives.

Since the degree of infiltrant-bleed-through was often variable, it was hypothesized that the solvent contact time with the part as well as the solvent polarity (solvent strength relative to epoxy binder) might be a factor. Zirconia, suspended in a variety of organic solvents with differing polarities and boiling points, was sprayed onto green parts that were subsequently sintered and infiltrated. Acetone was found to be the preferred solvent. The zirconia-solvent mixture was sprayed to maximize the effect of the quantity of material applied as well as to minimize possible mechanical application effects. The coating thickness was critical to minimize the infiltrant-bleed-through problem. Excessive coating thickness causes surface cracking of the part surface and lift off of the surface enhancer, permitting infiltrant-bleed-through. High polarity solvents better suspended the zirconia particles.

Polymers of various polarities and glass transition temperatures were added to the acetone-zirconia suspension. Polymer glass transition temperature was not found have an effect. However, it was found that polymers that bind strongly to the part surface greatly improved or eliminated the infiltrant-bleed-through situation. Polymers that aggressively adhered to the part surface (often containing carboxylic functionalities) also deformed and wrinkled these surfaces. This effect was inversely proportional to the amount of infiltrant-bleed-through in the negative sense. Many polymers and polymer mixtures were evaluated in an effort to balance the infiltrant-bleed-through effect against surface cracking and wrinkling. These included polystyrene; two-part epoxy; polymethylmethacrylate; polyvinylacetate; polybutylmethacrylate; polyethymethacrylate; poly(t-butylacrylate-co-ethylacrylate-co-methacrylic acid); poly (ethylmethacrylate-co-methylacrylate); poly(styrene-co-maleic acid), partial sec-butyl/methyl ester; poly(styrene-co-maleic acid), partial 2-butoxy/ethyl ester; poly(styrene-co-maleic acid), propyl ester; poly(methylvinylether-alt-maleic acid); and poly (ethylene-co-methylacrylate-co-acrylic acid) available from Sigma-Aldrich Chemical Co.

Polymer concentrations between about 0.5% and about 4% relative to the carrier solvent were tested with zirconia loading of 25 g per 100 g solvent. The optimum formulation contained about 2% poly(styrene-co-maleic acid), partial sec-butyl/methyl ester. Concentrations less than about 2% were inadequate to prevent infiltrant-bleed-through and 4% concentrations often produced surface defects. It was found that excessively thick coatings of this zirconia-polymer inhibitor could also result in cracked and deformed surfaces. It was demonstrated that only very thin coatings of this formula are necessary to inhibit infiltrant-bleed-through. Coatings as thin as about 1 micron are effective to inhibit bleed-through. This result dictates that the polymer to zirconia ratio remain constant during application. In the existing commercial formulation of enhancer, zirconia precipitates rapidly to the bottom of the aerosol can, causing the undesirable uneven coating of zirconia and propellant and polymer containing solvent to be applied. Since the enhancer material is drawn from the bottom of the aerosol can, this zirconia precipitation phenomenon would result in the application of zirconia with insufficient polymer when the aerosol can is full, and excessive amounts of polymer as the can is emptied.

Several additives that chemically react with the surface of the zirconia particles to make them more hydrophobic can be employed. This surface treatment increases the suspension time of the zirconia particles in acetone and helps break up agglomerates. Zirconia particles (about 0.6$\mu$) suspended in acetone were treated with zirconate and titanate coupling agents from Kenrich Petrochemicals.

Different methods can be used to evaluate the precipitation of the coupling agents. One volumetric screening method used a 100 ml graduated cylinder filled with the zirconia-acetone suspension previously treated with the coupling agent. A distinct separation forms between the zirconia and the supernatant. The rate of precipitation of the finest material can be followed as a function of time. This volumetric method works well for screening of the rapidly precipitating formulations, but some formulations kept ultrafine materials suspended for long periods of time and can be difficult to follow the precipitation of the bulk material. Another method is a gravimetric method.

Organometallic binding agents, such as the zirconates NZ09 and KZ55 were studied. The organometallic binding agent reacts with the surface of the zirconia to lower the surface energy of the zirconia to make it more compatible with the organic solvent. Zirconates were thought to be preferable to titanates since zirconates degrade to zirconium oxide (zirconia) and so would not interfere with any surface energy relationship to the infiltrant. While KZ55 was found to reduce the zirconia precipitation rate by a factor of 80, the shelf life of the resulting formulation is substantially shortened. It was found that the shelf life was shortened because the reactive end groups of the KZ55 react with the residual peroxide in the polymer to problematically create agglomerates. Further investigations with the titanate coupling or binding agents KR138S, KR41B and KR46B indicated that KR41B, while not as good as KZ55 in terms of reducing the rate of precipitation, is the best choice for performance and stability (FIG. 1). Both the volumetric and gravimetric test methods showed about a 2.0% concentration of KR41B to be optimum for minimizing the rate of zirconia precipitation (FIGS. 2 and 3). Higher concentrations of KR41B increased the precipitation rate.

This balance of infiltrant-bleed-through inhibition with polymer adhesion and concentration, against surface cracking has yielded a formula that performs quite well to inhibit infiltrant-bleed-through. An additional benefit gained from incorporating a polymer is that the parts can be handled immediately after spraying. The resulting zirconia coating also is more durable and is not removed simply by handling as occurred with prior formulations.

The problem of carbon residue scavenged from the binder gases can be corrected by minimizing the surface area of the metal infiltrant, such as bronze, which minimizes the sequestration of carbon as a consequence. The use of fused bronze pieces essentially eliminated the problem of the carbon residue. The pieces should weigh between about 50 grams and about 100 grams to avoid under or over filling the reservoir apparatus. The bronze should contain about 11% by weight tin. Less than 10% by weight tin causes the final parts to be soft while greater than about 11.5% by weight tin causes the parts to be brittle and have low impact strength.

The present invention is further described in detail by means of the following Examples. All percentages are by weight unless otherwise noted.

EXAMPLE 1

Zirconia Coatings

Zirconia coating formulations were mixed by hand in a breaker until the agglomerates were separated. The formula and mixing procedure is described below. Zirconia suspensions were subsequently applied to green parts using a compressed air paint sprayer while continuously agitating to maintain the suspension. For comparison, these same materials were also applied using a common paintbrush. The solutions containing about 2% polymer in acetone performed best. While original experiments utilized 250 grams zirconia to 1,000 grams acetone, subsequent work with test samples containing 30% A70 propellant indicated a greater ratio of zirconia was required.

| Final Formulation: | |
|---|---|
| Acetone | 1000.0 g |
| Poly(styrene-co-maleic acid) partial sec-butyl/methyl mixed ester | 32.0 g |
| Ken-React KR41B | 8.0 g |
| Zirconium Dioxide | 400.0 g |

The Kenrich Petrochemical Ken-React KR41B was added to the acetone first. Since KR41B is not very soluble in acetone, an emulsion was formed while stirring. The zirconium dioxide was then added. Vigorous mixing of the zirconium dioxide helps the 0.6 $\mu$ particles deagglomerate so that they remain in suspension for a longer period of time.

To permit the KR41B to chemically react with the zirconia particle surfaces, it was necessary to continue mixing for 30 minutes. Finally, the polymer was added while stirring vigorously in order to avoid agglomeration of the polymer particles during dissolution. The polymer dissolved easily in acetone. The mixing was continued until the polymer was completely dissolved (5–10 minutes) before packaging. If the order of addition is reversed, a precipitate will form with the polymer. The above formula is packaged with A70 propellant (50% propane; 50% butane) in a 70:30 ratio respectively in aerosol spray cans.

EXAMPLE 2
Zirconia Precipitation Measurement: Volumetric Method

Figure 2:
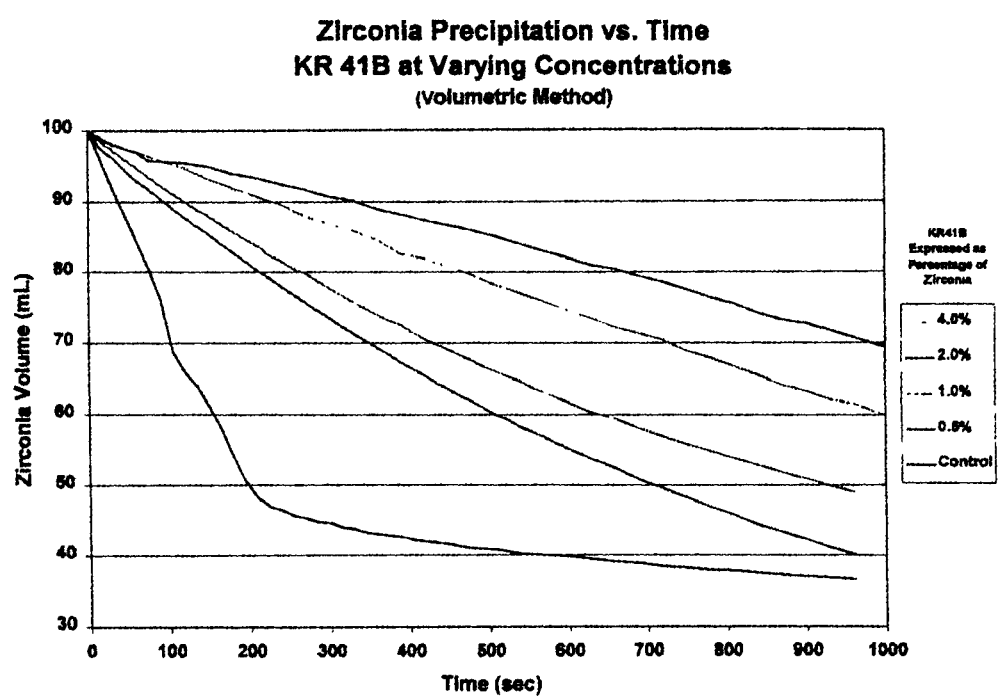
FIG. 2 is a graphical illustration of the precipitation rate of zirconia when treated with a preferred titanate coupling agent.

The zirconia suspension of Example 1 was continuously agitated and then poured directly into a 100 ml graduated cylinder measuring 25 mm in diameter by 240 mm high. The cylinder was filled to the 100 ml mark and readings were begun immediately. The decreasing volume of zirconia remaining in suspension was recorded as a function of time. The interface between the zirconia and the supernatant liquid defined the volume at time T. Because this method is based on observing the last material to precipitate, the method is biased toward the smallest particles. Results of different weight percentages of zirconia using this method are shown in FIG. 2.

EXAMPLE 3
Zirconia Precipitation Measurement: Mass Accumulation Method

Figure 3:
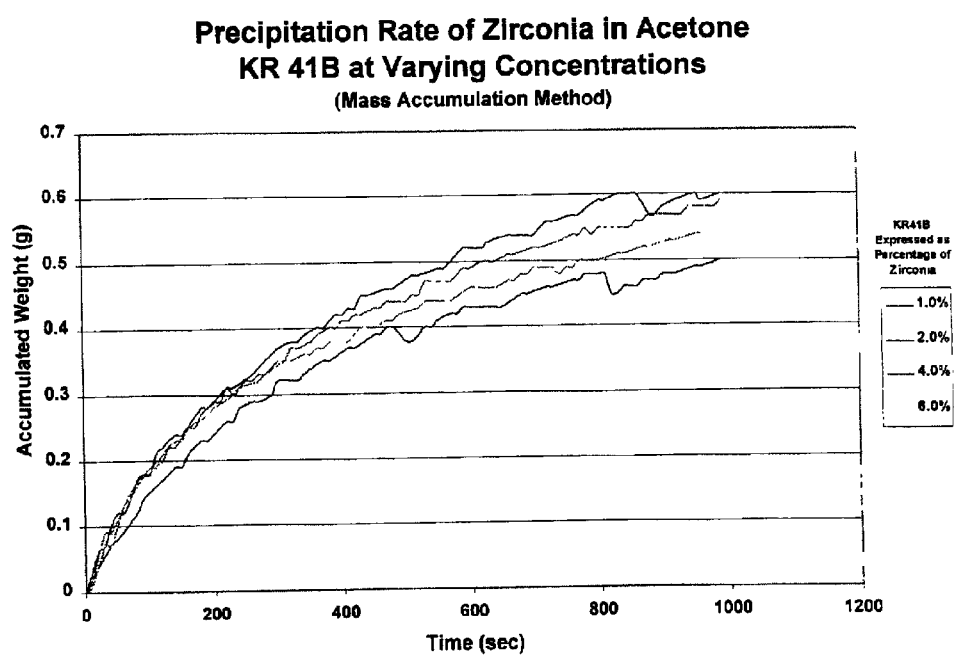
FIG. 3 is a graphical illustration of the precipitation rate of zirconia in a solvent at varying concentrations by weight of the titanate coupling agent.

A heavy collection platform was suspended within a 25 mm diameter glass cylinder approximately 40 mm from the bottom of the cylinder. The platform was not located too close to the bottom of the cylinder to prevent precipitates from the suspension hindering movement of the collection platform. There was approximately a 1 mm gap between the platform and the cylinder walls enabling the collection platform to move freely. The platform was constructed from a U.S. five-cent piece having two very small holes from which it was suspended by very thin wires. The suspension wire was attached to a digital balance. The platform mass was recorded as a function of time via the RS-232 port on the balance and the use of a custom visual basic program. However, manual observation of mass recordings can be as effective. The cylinder was filled with zirconia suspension such that the suspended platform would collect all of the precipitate from a 150 mm column of suspension. This method recorded the entire quantity of zirconia precipitation as a function of time. Because the buoyant force of the suspension varied as a function of the density of the zirconia suspension, and this density varied with time, the mass reported by the balance also varied with time, relative to the absolute mass. However, this method was used to measure the relative differences between formulations. No effort was made to correct for the buoyant force of the suspension. Results of different weight-percentages of zirconia using this method are shown in FIG. 3

While the invention has been described above with references to specific embodiments thereof, it is apparent that many changes, modifications and variations in the materials, arrangements of parts and steps can be made without departing from the inventive concept disclosed herein. For example, it is to be understood that the enhancer formulation of the present invention is equally well applicable to metal or metal/ceramic articles produced by selective laser sintering. In this process a green part is placed in an oven with infiltrant metal, for example bronze, placed adjacent to and in contact with it through appropriate means, such as a metal base plate or in any other manner that brings liquid infiltrant into contact with the sintered parts. The infiltrant metal then infiltrates the green part. The green part is a matrix of metal or metal/ceramic powder and organic polymeric binder. To practice this invention, the green part is coated with the enhancer formulation of the present invention, such as by spraying, brushing, immersing, or other appropriate method. Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

What is claimed is:

1. A formulation for enhancing the surface appearance of an infiltrated metal or metal/ceramic composite pert comprising:
    (a) a solvent;
    (b) an organometallic binding agent;
    (c) zirconium dioxide; and
    (d) at least one polymer selected from the group consisting of poly(styrene-co-maleic acid) partial sec-butyl/methyl mixed ester; poly(styrene-co-maleic acid) partial 2-butoxy/ethyl mixed ester; and poly(styrene-co-maleic acid) propyl ester, the polymer comprising between about 0.5% to about 4% by weight in the solvent.

2. The formulation according to claim 1 wherein the binding agent is selected from the group consisting of titanate and zirconate, and combinations thereof.

3. The formulation according to claim 1 wherein the at least one polymer is poly(styrene-co-maleic acid) partial sec-butyl/methyl mixed ester.

4. The formulation according to claim 1 wherein the solvent is acetone.

5. A formulation for coating the surface of an infiltrated metal or metal/ceramic composite part, the improvement comprising adding to zirconium dioxide at least one of an organometallic binding agent or agent and at least one polymer selected from the group consisting of poly(styrene-co-maleic acid) sec-butyl/methyl mixed ester; poly(styrene-co-maleic acid) partial 2-butoxy/ethyl mixed ester; and poly(styrene-co-maleic acid) propyl ester.

6. The formulation of claim 5 wherein the at least one binding agent is selected from the group consisting of titanate and zirconate, and combinations thereof.

7. The formulation according to claim 5 wherein the at least one polymer is poly(styrene-co-maleic acid) partial sec-butyl/methyl mixed ester.

8. The formulation according to claim 5 further comprising a solvent.

9. The formulation according to claim 8 wherein the solvent is acetone.

* * * * *